3,366,080
FLUIDIZED BED COMBUSTION SYSTEM
Orris E. Albertson, Norwalk, Conn., assignor to Dorr-Oliver Incorporated, Stamford, Conn., a corporation of Delaware
Filed Dec. 8, 1966, Ser. No. 600,115
15 Claims. (Cl. 110—8)

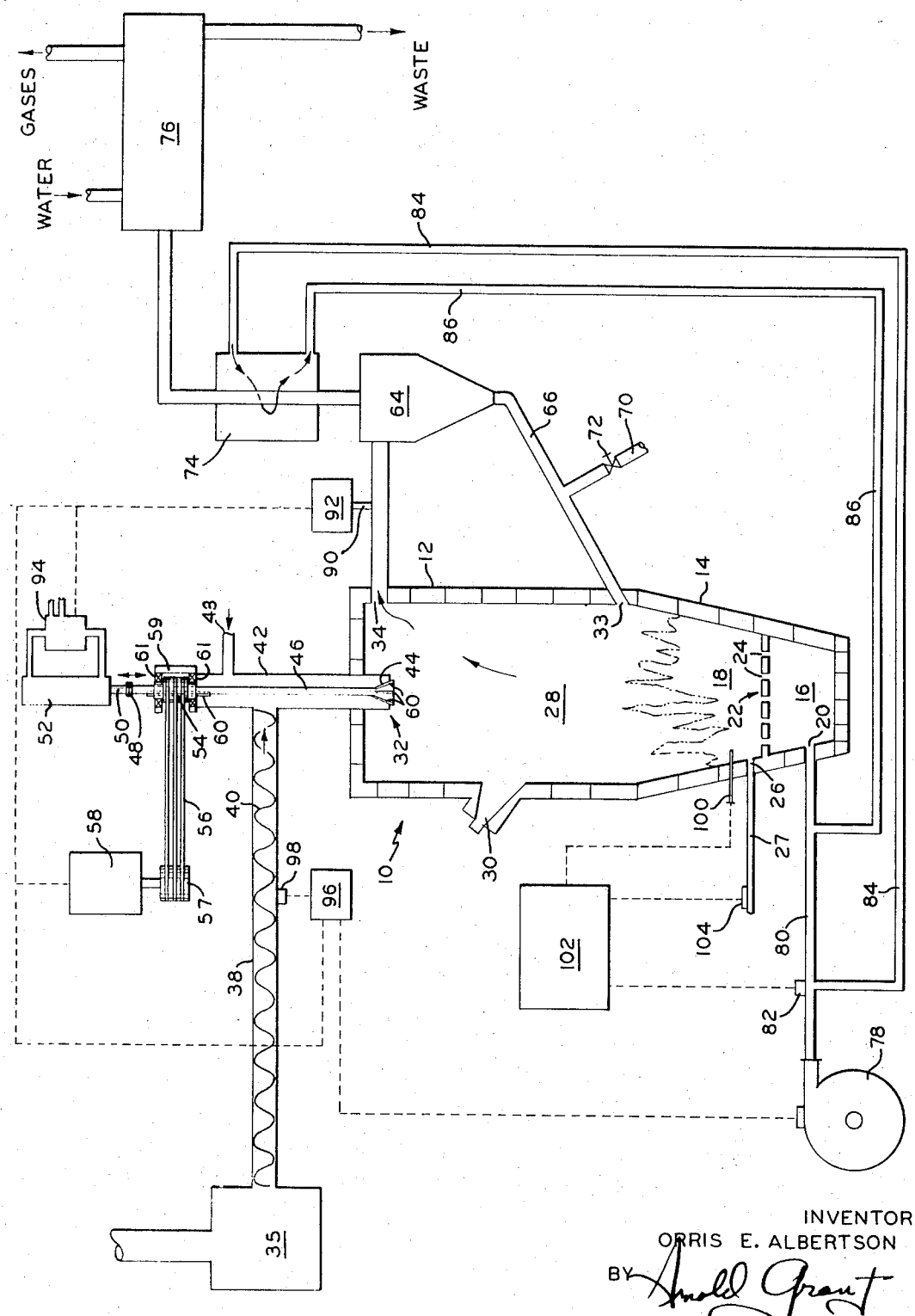

ABSTRACT OF THE DISCLOSURE

An apparatus and method for adjustably spraying organic waste material into the freeboard end of a fluidized bed reactor to utilize the excess heat generated by freeboard burning and to control the exit temperature of the discharged gases.

---

Fluidized bed incineration of organic waste material is a relatively recent concept which has found wide acceptability in the sanitation art because of the completeness of the combustion process, its process stability, low excess air requirements, and its ability to maintain deodorization temperature for the discharged gases, all within reasonable cost parameters. Organic waste material, for example, in the form of a dewatered sludge, ranging from 15–50% solids is introduced into a fluidized granular bed having high heat storing and heat radiating properties. The bed, which is usually comprised of sand or other inert material is maintained in a fluidized state by the combustion air being forced upwardly through the bed. The degree of fluidization is a function of the space rate, i.e., cubic feet per minute of air fed into the bed, and the relative size distribution of the granular material that comprises the bed.

The operating efficiency of a fluidized bed incinerator depends, to a large extent, on the amount of heat energy that the bed can extract from the exothermic combustion of the organic waste feed. Because of the granular make-up of the fluidized bed, heat energy released by combustion in one part of the bed is almost instantaneously transmitted to the rest of the bed. Thus the more efficient the combustion of the feed material within the bed, the less auxiliary fuel that has to be added to the system to maintain the bed at the ignition temperature of the organic feed material, and correspondingly the more economical the system. Since there is a negligible amount of heat transfer, by radiation, from the freeboard, i.e., the area of the reactor above the fluidized bed, to the fluidized bed, optimum efficiency depends upon achieving the combustion of the organic waste feed material within the confines of the bed. The amount of combustion that occurs in the freeboard space above the fluidized bed not only directly affects the amount of auxiliary fuel that must be added to the system but also the amount of feed material that can be combusted in the system. Any incompletely combusted waste material and/or volatiles that escape the bed and oxidize in the freeboard to carbon dioxide and water generate heat energy which is transmitted to the freeboard gases. For example, a pound of carbon, one of the basic constituents of organic waste material, when completely oxidized to carbon dioxide produces 14,540 B.t.u. Had this combustion occurred in the fluidized bed the heat energy so produced would have been absorbed by the bed and used to maintain the bed at the ignition temperature. If this oxidation occurs in the freeboard, auxiliary fuel must be added to the bed to make up the loss and supply the requisite energy. This increases operating costs and correspondingly reduces efficiency. For a given reactor the size, and thus its B.t.u. capacity, is fixed so that any increase in auxiliary fuel added to the system requires a corresponding decrease in organic waste material added to the system. This is because only the fixed amount of B.t.u.'s can be added to the system at one time, and this loss in solids capacity further reduces efficiency.

The inefficiency which the freeboard burning problem has created can be illustrated by the following example. Assume oil as the fuel, a sludge cake of 25% solids, 1300° F. as the bed temperature and 1650° F. as the exit temperature of the combusted gases, all of which are normal operating conditions for existing fluidized bed combustion units. Studies have shown that only 1350° F. is needed to completely deodorize the stack gases as they leave the fluid bed reactor, so that the 300° F. of superheat above 1350° is completely unnecessary and therefore wasted. The additional heat required to superheat gases from 1350° F. to 1650° F. is approximately a net of 300 B.t.u. per pound of wet feed solids. Since this 300 B.t.u. per pound of wet feed solids is produced but not recovered within the limits of the fluid bed the result is that auxiliary fuel must be added to the system to incinerate the sludge. Without an air pre-heater this would require a gross heat input of 500 B.t.u. per pound of auxiliary fuel or a total of 4,000,000 B.t.u. per ton of dry solids in additional auxiliary fuel in order to maintain bed temperature, since freeboard burning is superheating the gases to excessive exit temperatures. Assuming a fuel cost of $.75 per million B.t.u., this means the system is incurring an added, unnecessary, operating cost of $3.00 per ton of dry solids. When determined on a weekly or monthly fuel cost basis this inherent inefficiency of the system becomes a significant factor in reducing the operating advantages of the fluidized bed reactor in comparison with other organic waste incineration systems.

The problem then became one of minimizing or eliminating the effect of afterburning of waste material and/or the volatiles in the freeboard space above the fluidized bed so as to reduce the auxiliary fuel input and correspondingly increase the organic waste feed capacity of the system. Applicant's approach to the problem is to make use of the freeboard burning phenomena, i.e., to utilize the heat energy in the freeboard space in the same manner as if that energy had been absorbed by the fluidized bed. Applicant found that by feeding the organic waste sludge through the freeboard space into the fluidized bed he could countercurrently heat the solids and evaporate part of their moisture by the time they reached the bed. Experimentation revealed that in less than eight feet of freeboard travel there would be a heat transfer of approximately 300° F., i.e., the waste particles would absorb 300° F. of heat energy and evaporate part of its moisture content while the stack gases would correspondingly lose 300° F. and be cooled by the evaporating moisture.

This 300° F. of freeboard heat transfer to the waste particles resulted in much less auxiliary fuel being required by the fluidized bed. The heat energy which auxiliary fuel would have supplied to the bed is no longer required because the heat energy in the freeboard, which previously was wasted, now performs that work.

Further experimentation revealed that certain organic waste sludges require a greater heat contact time in the freeboard space to absorb the heat from the rising gases. In order to be able to control the detention time and thus control the amount of heat transfer between the rising gases and descending organic waste particles so as to maintain the 1350° F. temperature which is the minimum for the deodorization of the stack gases, applicant incorporated an adjustable spray nozzle which, as will be described in greater detail below, can increase or decrease the angle of entry and the particle size of the sludge sprayed into the freeboard. By adjusting the angle of entry the sludge spray can be bounced off the walls of the freeboard at different heights above the bed to increase or decreases the heat contact time and thus increase or decrease the amount of heat transfer and evaporation taking place in the freeboard. Adjusting the particle size of the sludge spray also affects the amount of evaporation and heat transfer because it is axiomatic that smaller particles will release their moisture and absorb heat faster than larger particles of the same composition. Since an effective evaporation and heat transfer of 300° F. could be accomplished in less than eight feet of freeboard space, it was found that the total height of the reactor could be correspondingly reduced, freeboards in the range of 10 to 12 feet providing an optimum height for heat transferal and maintenance of 1350° F. as the exit temperatures of the stack gases. This saving in capitalization and service costs further enhances the attractiveness of the system.

The sludge particles after being partially dried in the freeboard descend into the bed for incineration and comminution. Some of the smaller particles may be completely combusted and transformed to a fine ash by the intense freeboard burning prevalent in the strata immediately above the bed. The ash thus produced is stripped by the rising gases and removed from the reactor. In order to incinerate and comminute the larger particles, applicant decided upon a shallow "jetting" bed rather than the usual fluidized bed having a depth of 5 to 6 feet. The jetting effect is accomplished by blowing the combustion air through the bed at a space rate of 3–7 feet per second which is much higher than that required for normal fluidization. The result is an extremely active turbulent expanded bed which rises in jets and spurts to heights well above the bed level. A "jetting" bed offers two advantages in an organic waste incineration system. First, it will eject the comminuted and combusted ash into the freeboard with sufficient momentum to entrain it in the rising gases, thereby removing it from the reactor. Second, in its state of intense turbulence and activity jets of bed material will pass through the layer of extreme temperature immediately above the bed and absorb some of this heat. This heat transfer from the freeboard to the bed by the bed, in effect, passing through the freeboard further reduces the auxiliary fuel requirements of applicant's incineration system.

In a preferred embodiment of the present invention efficiency is further increased by cycling the escaping gases and entrained ash through a cyclone and recycling any large or partially combusted particles back to the reactor. The cyclone serves three basic functions. First, by returning the particles to the reactor a high dust load can be maintained in the reactor to act as a heat sink. Second, by returning any large particles or partially combusted particles the system reduces the load on subsequent separation equipment and the percent solids in the stack gases released to the atmosphere is kept within required health limits. Third, the organic solids are oxidized in the ash recycle.

It is, therefore, an object of the present invention to control the exit temperature of the stack gases in organic waste incineration.

It is another object of the present invention to control freeboard burning in organic waste incineration by evaporating a portion of the moisture of the sludge particles to cool the rising superheated gases.

It is a further object of the present invention to control the exit temperature of the stack gases in organic waste incineration by adjusting the entrance characteristics of the feed material into the reactor.

Yet another object of the present invention is to cycle the products of combustion of organic waste incineration from the reactor to a cyclone and recycle the solids separated in the cyclone back to the reactor.

The subject matter which applicant regards as his invention is particularly pointed out and distinctly claimed in the concluding portion of this specification. The invention, however, as to its organization and method of operation together with further objects and advantages thereof will best be understood by reference to the following description taken in conjunction with the accompanying drawing which is a schematic representation of the present invention showing the flow of operation and some of the controlling, regulatory features of the feed arrangement and the "jetting" bed reactor.

Referring to the drawing a "jetting" bed reactor 10 is shown to illustrate an exemplary application of the present invention. However, it should be understood that the present invention is not limited in its application to the particular fluidized bed reactor disclosed.

Reactor 10 has a generally cylindrical upper portion 12 and conically shaped lower portion 14 with the outer shell constructed of steel and an inner shell of refractory brick. The lower conically shaped portion 14 houses the windbox chamber 16 and the "jetting" bed 18. Air for fluidization of the bed and combustion of the organic waste feed material is introduced into the windbox 16 through inlet 20 and is discharged into the bed 18 through a constriction plate 22 which has a plurality of tuyeres 24.

The "jetting" bed 18 which may be of graded sand or other ceramic material is kept in an expanded very turbulent "jetting" state by maintaining the space rate, i.e., the speed at which the fluidizing and combustion air is introduced into the bed, at a fairly rapid 3 to 7 feet per second. The term "jetting fluidized bed" is intended to define an extremely turbulent, active, expanded bed which jets to abnormal heights in relation to the bed depth and is capable of ejecting particles a sufficient distance above the bed so that they may become entrained by exhaust gases and not drawn back into the bed by settling. An auxiliary fuel inlet 26, connected through suitable piping 27 to a fuel supply (not shown), feeds fuel into the fluidized bed 18 if the bed temperature falls below a desired level. The controls for fuel feeding and its cooperating temperature sensing means will be described in greater detail below.

The upper cylindrical portion 12 of the reactor houses the freeboard chamber 28, a preheat burner 30 to aid start-ups, a sludge feed discharge 32, the exit conduit 34 for stack gases and the return passage 33 for recycled solids. Mechanically dewatered feed material after being treated, for example, by a filter or a centrifuge schematically shown as means 35 is fed to discharge 32 through conduit 38 by means of screw conveyor 40. The sludge is transported by conveyor 40 to mixing conduit 42 where it is mixed with air from inlet 43 and gravitates toward the feed discharge 32.

A vertically adjustable rotatable cone 44 is positioned within the discharge 32 to adjustably control the angle of entry, the speed of entry, and the degree of fineness of the sludge sprayed into the freeboard chamber. The cone 44 is connected to shaft 46 which is in turn connected by coupling 48 to ram 50 of hydraulic cylinder 52. A sheave 54 is fixedly attached on shaft 46 to rotate the shaft by means of belts 56, pulley 57, and motor 58. A yoke 59, key 60, and bearings 61 allow for the vertical adjustability of sheave 54. Hydraulic cylinder 52 raises and lowers the cone 44 to adjust the angle of entry of the organic feed material sprayed into the reactor. In this manner, the height in the freeboard relative to the bed where the spray will rebound off the reactor wall is adjusted to control the detention time of the feed particle in the freeboard and thus the degree of evaporation. Increasing or decreasing the speed of rotation of the cone 44 by adjustment of motor 58 will affect the speed of entry of the sludge and thus the particle size or fineness. It is axiomatic that, because of the more intimate heat contact and exchange, the smaller the particle size the more surface area and thus the greater the evaporation. The cone 44 has blades 60 spaced about its periphery to impart its speed of rotation to the particles of feed material.

With the detention time of the feed particles in the freeboard and the particle size of the feed thus controlled the amount of evaporation of moisture from the feed particles and the heat transfer from the rising combustion gases to the descending feed particles is also controlled. The desired minimum deodorization temperature of 1350° F. can thereby be maintained even though feed compositions vary. If, for example, the temperature in the freeboard begins to rise, the relative position of cone 44 in conduit 32 can be adjusted to change the angle of entry and increase the detention time of the feed particles. The more heat contact time the more heat transfer between rising gases and descending feed particles. As an alternative the speed of cone 44 can be increased, imparting an increased velocity to the particles as they leave conduit 32. The particles, because of their increased velocity will strike the walls of the reactor with greater impact and rebound back into the freeboard as smaller particles. The smaller particles will release more moisture resulting in more heat transfer and a reduction in the exit temperature of the stack gases. In certain situations, depending upon the composition of the feed and its moisture content both the speed of rotation of the cone 44 and its vertical position relative to the discharge 32 can be adjusted to make the proper compensations for increased freeboard burning. The same is true if for some reason the exit temperature of the stack gases should drop below the deodorization temperature minimum of 1350° F.

Continuous spraying of the sludge particles against the walls of the reactor at a particular level in the reactor has a tendency to create localized cooling and a subsequent build-up of sludge particles along the walls at this relatively cooled level. To alleviate this effect the cone 44 can be made to continuously shift its vertical position and traverse a pre-determined range of the reactor wall within a pre-determined time period. Any temperature compensations that are required by shifts in the exit temperature of the stack gases can then be made by relocating the range of vertical oscillation or by increasing or decreasing the rotative speed of the cone. Continuous shifting of the vertical position of the cone can be accomplished by any known means such as a cam automatic shifting of the inlet and discharge sides of hydraulic cylinder 52, or springs, etc.

The feed particles enter the reactor and immediately encounter the hot gases and entrained ash escaping from the fluidized bed. There is intimate contact and rapid heat transfer with the moisture in the feed particles first being evaporated off in the upper freeboard and then the particles themselves starting to burn in the lower freeboard and the bed. As the particles descend further into the freeboard, the heat and velocity of the rising gases become more intense. The particular fluidized bed reactor shown in FIGURE 1 is especially well suited to this type of operation because the velocity of escaping gases is greatest immediately above the fluidized bed and decreases in relation to the distance from the bed. Thus, any larger particles which may have been ejected from the "jetting" bed and which are too large to be entrained by the escaping gases will fall, because of their own weight, back into the bed for further comminuting and incinerating. The degree of taper is designed in relation to the average moisture content of the type of feed material to be treated. Tapering the bed has been found to increase efficiency because the air volume at bed temperature is equal to approximately 55–75% of the maximum gas volume including moisture. The taper provides a uniform velocity of the gases throughout the bed.

The feed particles fall into the "jetting" bed where they are incinerated and comminuted by the heat and turbulent interaction of the sand grains. The fine ash is then ejected upwardly where it is entrained with the escaping gases.

The "jetting" bed because of its expanded state and extreme turbulence created by the 3 to 7 feet per second space rate will rise and fall in great spurts through the layer of intense heat immediately above the bed. In this manner the bed will absorb some of the heat from the freeboard and thus further reduce the auxiliary fuel required to maintain the bed at the ignition temperature of the feed material.

In a preferred embodiment of the present invention the escaping gases and entrained ash, dust and partially combusted particles are cycled from the reactor through exit 34 to a hot gas cyclone 64. It should be noted that as long as the temperature of the exit gases is maintained at at least 1350° F. any products discharged from the reactor will be completely deodorized even though some particles, such as carbon, may not be completely combusted. The cyclone serves three basic functions. First, by returning sand and dust to the reactor, a high dust load is maintained to act as a heat sink. Second, by recycling any partially combusted particles the preferred system reduces the load on subsequent separation equipment and keeps the percentage solids entrained in the stack gases within desired health limits; and third, it oxidizes the organic solids in the ash recycle. The solids separated in cyclone 64 are discharged through conduit 66 and re-enter the reactor through passageway 33 which is positioned in the layer of extreme turbulence just above the bed 18. A bleed outlet 70 having valve 72 is provided along conduit 66 to remove part of the return flow from the cyclone in order to maintain the proper balance within the system. The stack gases after being discharged from the cyclone can, if desired, be passed through a heat exchanger 74 to preheat combustion air and through a scrubber 76 to remove any remaining entrained particles before being discharged to the atmosphere.

Combustion air is supplied to the windbox 16 from blower 78 through conduit 80 and inlet 20. If it is desired to preheat all or part of the combustion air before introducing it into the windbox, an automatically controlled by-pass valve 82 can be provided in conduit 80. The air will then be shunted through conduit 84 into heat exchanger 74 and back through conduit 86 into conduit 80, inlet 20, and windbox 16.

A monitoring tube 90 in passageway 34 detours part of the discharge flow of escaping gases and entrained solids. A conditions analyzer and control station 92 continuously monitors the gases from tube 90 for temperature, oxygen content, and any other criteria deemed indicative of conditions in the system, and compares the result to predetermined desired levels. The control station will then adjust the various inputs to the system to maintain the desired levels. Control station 92 will adjust the relative height of cone 44 in discharge 32 by an appropriate signal to a pump (not shown) and 4-way valve 94. The ram 50 and shaft 46 will be moved in response to the shift of fluid in hydraulic cylinder 52 to adjust the relative positions of cone 44 and discharge 32. A signal from control station 92 to motor 58 will also increase or decrease the rotations per minute of the cone 44. The control station 92 also maintains the proper oxygen level in the system to insure complete combustion of the feed by an appropriate signal to the feed-air ratio control 96. The feed-air ratio control is electrically connected to control valve 98 in feed conduit 38 and to combustion blower 78 to increase or decrease the feed of organic waste or air to the system.

The temperature of the fluidized bed may also be maintained at desired levels by means of thermocouple 100 which is electrically connected to bed temperature control 102. The bed temperature control monitors the temperature in the bed and is electrically connected to by-pass valve 82 in combustion air conduit 80 and valve 104 in fuel feed line 27. If the temperature in the bed should exceed desired limits the amount of pre-heated air can be reduced. If the bed comes too cool for proper operation auxiliary fuel can be added by a signal to valve 104, or more air can be pre-heated by adjusting valve 82.

As this invention may be embodied in several forms without departing from the spirit or essential character thereof, the present embodiment is illustrative and not restrictive. The scope of the invention is defined by the appended claims rather than by the description preceding them, and all embodiments which fall within the meaning and range of equivalency of the claims are therefore intended to be embraced by those claims.

I claim:
1. A thermal reactor for incinerating organic waste material comprising a windbox, an air permeable constriction plate above said windbox, a jetting bed on said constriction plate, a freeboard chamber above said jetting bed, an outlet at the upper end of said freeboard chamber to exhaust the combustion products of the incinerated organic waste, a conduit for feeding organic waste sludge to the upper end of said freeboard chamber, and means in said conduit for directing the sludge against the walls of said freeboard chamber, said means being separably adjustable to vary both the angle of entry and the particle size of the sludge being sprayed into the freeboard chamber.

2. A thermal reactor for organic waste material as defined in claim 1 further including means in said outlet to sense a set of predetermined criteria in said outlet, and means to compare the conditions in said outlet with a set of predetermined desired conditions and adjust said directing means to separably vary the angle of entry and the particle size of the sludge being sprayed into said freeboard chamber to maintain the predetermined desired conditions.

3. A thermal reactor for organic waste material as defined in claim 2, further including first means associated with said directing means to vertically adjust said directing means in said conduit to vary the angle of entry of the organic waste being fed into said freeboard chamber.

4. A thermal reactor for organic waste material as defined in claim 3 wherein said first means associated with said directing means includes means to continuously oscillate said directing means in a vertical plane to prevent localized cooling of the reactor walls.

5. A thermal reactor for organic waste material as defined in claim 2, further including separating means at the discharge end of said exhaust outlet, said separating means stripping the entrained solids from the combustion gases and returning at least part of the solids to said thermal reactor.

6. A thermal reactor for organic waste material as defined in claim 5 wherein said separating means is a gas cyclone and the solids re-enter said thermal reactor at a point above said jetting bed.

7. A thermal reactor for organic waste material as defined in claim 2, further including second means associated with said directing means to rotate said directing means in said conduit, the speed of rotation determining the particle size of the organic waste material being fed into said freeboard chamber.

8. A thermal reactor for organic waste material as defined in claim 7 wherein said directing means has a conically shaped body a portion of which extends out of said feeding conduit, and means on said conically shaped body to impart the rotative force of said body to the organic waste material being fed.

9. A fluid bed combustion reactor comprising a windbox, an air permeable constriction plate, a fluidized bed on said constriction plate, a freeboard chamber above said fluidized bed, an outlet in the upper end of said freeboard chamber to exhaust the products of combustion of the fluidized bed, conduit means in the upper end of said freeboard chamber to feed material to be combusted into said freeboard chamber, temperature sensing means in said outlet, and means for controlling the detention time of the materials to be combusted in said freeboard chamber in relation to signals from said temperature sensing means.

10. A fluid bed combustion reactor as defined in claim 9 wherein said conduit means directs the material to be combusted against the walls of the freeboard chamber, said last mentioned means further controlling the particle size of the material to be combusted as it is directed into said freeboard chamber.

11. A thermal reactor for the combustion of mechanically dewatered organic waste material comprising a windbox, an air permeable constriction plate above said windbox, a fluidized bed on said constriction plate, a freeboard chamber above said fluidized bed, an outlet from said freeboard chamber to exhaust the combustion products of the incinerated organic waste, a conduit for feeding organic waste material against the walls of said freeboard chamber, and means in said conduit for controlling the amount of evaporation of moisture from the organic waste material as it proceeds through said freeboard to said fluidized bed.

12. A thermal reactor for the combustion of mechanically dewatered organic waste material as defined in claim 11 wherein said reactor is tapered in the area of the fluidized bed, the degree of taper being in relation to the volume of gases produced as a result of the combustion of the waste material in the fluidized bed.

13. A thermal reactor for the combustion of mechanically dewatered organic waste sluge comprising a windbox, an air permeable constriction plate above said windbox, a fluidized bed on said constriction plate, a freeboard chamber above said fluidized bed, means in said freeboard chamber to direct the organic waste sludge against the walls of said chamber, an outlet from said freeboard chamber to exhaust the combustion products of the organic waste sludge, a first conduit having one end fixedly attached to said outlet, a gas cyclone fixedly attached to the other end of said first conduit to separate entrained solids from the escaping gases, a second conduit leading from said cyclone back to the freeboard chamber to recycle the stripped solids, the solids entering the freeboard chamber at a point above the fluidized bed.

14. A thermal reactor for the combustion of mechanically dewatered organic waste sludge as defined in claim 13 wherein the means in said freeboard chamber to direct the sludge against the walls of said freeboard chamber comprises a feed conduit and an inverted vertically adjustable rotating cone in said feed conduit, said cone having means thereon to impart its rotative energy to the sludge, said cone being adjustable to vary the angle of entry of the sludge into the freeboard chamber.

15. A thermal reactor for the combustion of mechanically dewatered sludge as defined in claim 14, further including temperature sensing means in said freeboard chamber outlet and means for controlling the speed and relative position of the cone in the feed conduit relative to a signal from said temperature sensing means.

References Cited
UNITED STATES PATENTS 3,319,586 5/1967 Albertson et al. _____ 110—8
3,322,079 5/1967 Komline et al. _____ 110—8

JAMES W. WESTHAVER, *Primary Examiner.*